United States Patent
Tsutsumi et al.

(10) Patent No.: US 6,730,850 B2
(45) Date of Patent: May 4, 2004

(54) PROTECTIVE GUIDE FOR DRAWING CABLE OR THE LIKE

(75) Inventors: Kazuhiro Tsutsumi, Osaka (JP); Akihiko Utaki, Osaka (JP); Yoshinori Iwasaki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/411,998

(22) Filed: Apr. 11, 2003

(65) Prior Publication Data
US 2004/0000422 A1 Jan. 1, 2004

(30) Foreign Application Priority Data
Jun. 28, 2002 (JP) ........................................ 2002-190409

(51) Int. Cl.$^7$ .................................................. H01B 7/00
(52) U.S. Cl. ............................ 174/111; 59/78.1; 248/49
(58) Field of Search ..................... 59/78.1, 78; 248/49, 248/51; 174/68.1, 68.3, 111, 95, 97; 191/12 R, 12 C

(56) References Cited
U.S. PATENT DOCUMENTS 3,921,388 A * 11/1975 Loos et al. ................. 59/78.1
5,149,017 A * 9/1992 McEntire et al. ........ 244/114 R
6,158,555 A * 12/2000 Brown, Jr. ................... 187/414
6,481,195 B1 * 11/2002 Blase .......................... 59/78.1

* cited by examiner

Primary Examiner—Chau N. Nguyen
(74) Attorney, Agent, or Firm—Dann, Dorfman, Herrell and Skillman; Henry H. Skillman

(57) ABSTRACT

To provide a protective guide for a retracting cable or the like to which excessive tension or stress is not imparted to a cable or the like during bending and extending or retracting operations operating a retracting unit in and out, and which does not need a troublesome securing operation for a cable or the like, and further which is excellent in even point of aesthetics. The present invention relates to a protective guide for a retracting cable or the like, which protects and guides a cable or the like extending between a case body 130 and a retracting unit 110 retractably accommodated in the case body. According to the present invention, the protective guide includes two linear tubular support members 140, which enclose the cable or the like to support it in a linear manner and a tubular bending member 120, which articulately connects said two linear support members 140 with a desired curvature or more.

3 Claims, 3 Drawing Sheets

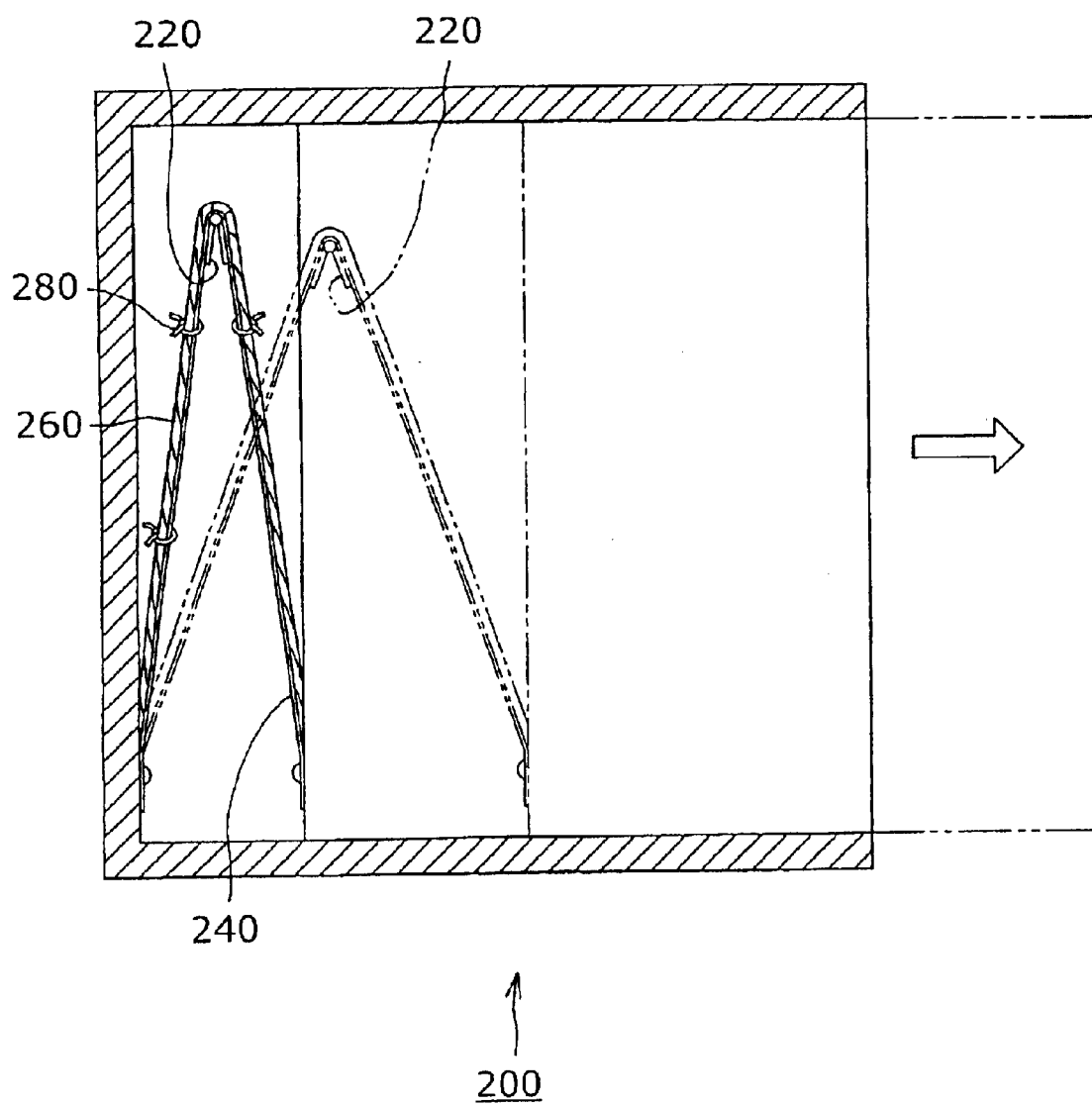

PROTECTIVE GUIDE FOR DRAWING CABLE OR THE LIKE

FIELD OF THE INVENTION

The present invention relates to a protective guide for a retracting cable or the like, which protects and guides a cable or the like trained between a case body and a retracting unit retractably accommodated in the case body.

BACKGROUND OF THE INVENTION

As a conventional protective guide for a retracting cable or the like, which protects and guides a cable or the like trained between a case body and a retracting unit retractably accommodated in the case body has been known to provide a protective guide for a retracting cable or the like in which a cable or the like 260 was secured to a sheet metal support member 240 articulately jointed by a hinge 220, by strings 280 or the like as shown in FIG. 4.

However, in the conventional protective guide 200 for a retracting cable or the like, since the articulated portion is jointed by the hinge 220, the two sheet metal support members 240 are connected by a sharp bend during bending thereof and tension is imparted to the cable or the like 260 secured to the sheet metal support member 240 thereby leading to a cause of the breakage of the cable or the like 260.

Further, since the cable or the like 260 is secured to the sheet metal support member 240 by strings 280 or the like, stress is imparted to the cable or the like 260 every time of bending, which causes the breakage thereof. Further, an operation of securing the cable or the like 260 to the sheet metal support member 240 by strings 280 or the like is troublesome, which increases in the production cost.

Further, since the weight of the sheet metal support member and the cable or the like is concentrated in one hinge, the service life of the hinge was reduced. And since the cable or the like is mounted on the sheet metal support member in an exposed manner, improvement has been desired from the viewpoints of aesthetics and reliability.

SUMMARY OF THE INVENTION

Accordingly, the object of the present invention is to provide a protective guide for a retracting cable or the like to which excessive tension or stress is not imparted to a cable or the like during bending and extending or retracting operations in taking a retracting unit in and out, and which does not need a troublesome securing operation for a cable or the like, and further which is excellent in even a point of aesthetics.

The protective guide for a retracting cable or the like according to the present invention solves the above-mentioned object by a protective guide for a retracting cable or the like, which forms a tubular enclosure which protects and guides a cable or the like trained between a case body and a retracting unit retractably accommodated in the case body, characterized in that said protective guide includes two linear tubular support members, which support said cable or the like in a linear manner, and a tubular bending member, which articulately connects said two linear support members with a desired curvature without a sharp bend.

Since the protective guide for a retracting cable or the like according to the present invention includes two linear support members, which said support said cable or the like in a linear manner, and a bending member, which articulately connects said two linear support members with a desired curvature without a sharp bend. Accordingly, a retracting unit is smoothly slid on a case body without imparting excessive tension or stress to the cable or the like.

BRIEF DESCRIPTION OF THE DRAWINGS

FIG. 4 is a schematic view explaining a conventional protective guide for a cable or the like.

DESCRIPTION OF THE PREFERRED EMBODIMENT

Figure 1:
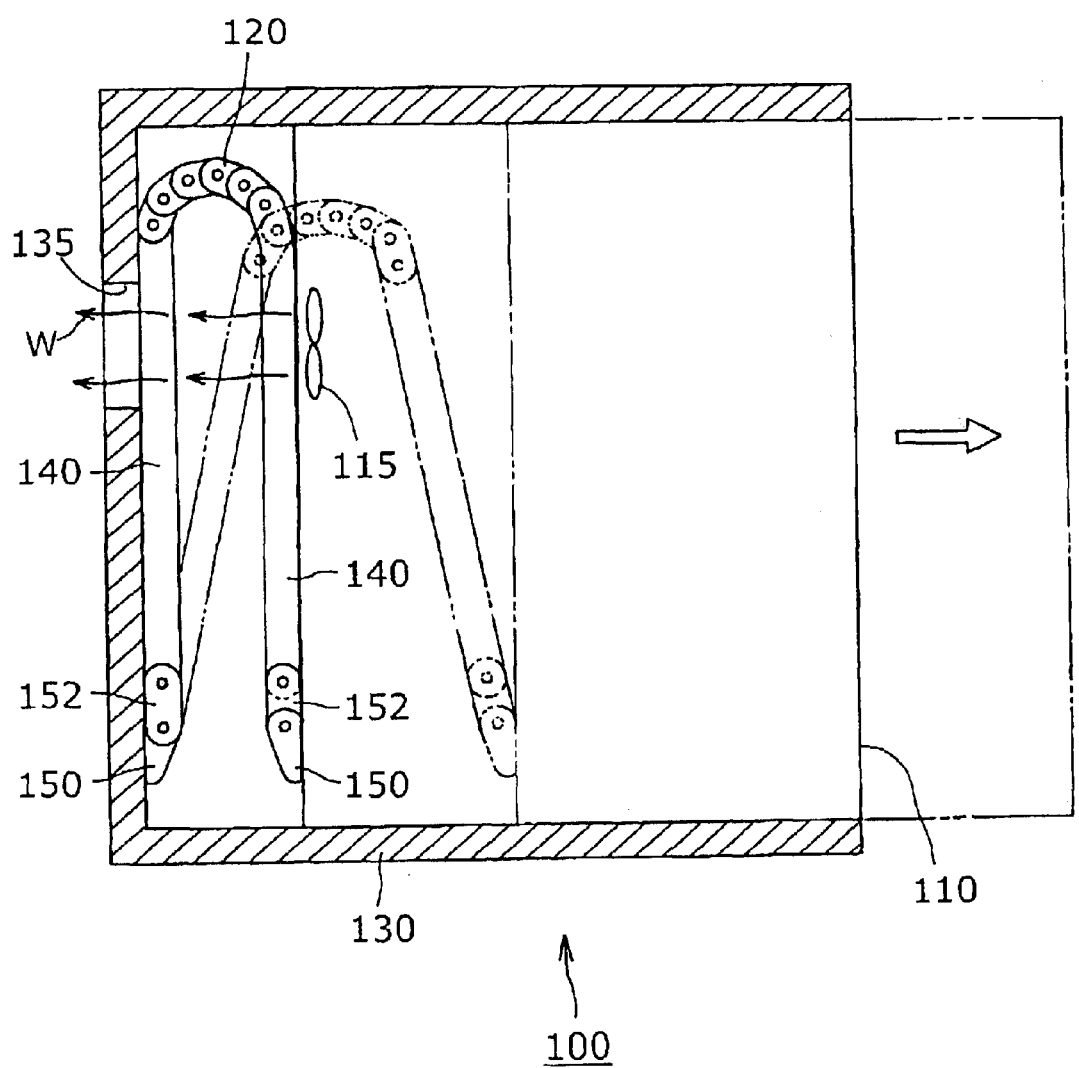
FIG. 1 is a schematic view showing a protective guide for a retracting cable or the like, which is an example according to the present invention.

Next, a preferred embodiment of the present invention will be described with reference to drawings. FIG. 1 is a conceptual illustration showing a protective guide 100 for a retracting cable or the like, which is one example of the present invention. The reference numeral 110 denotes a retracting unit retractably accommodated in a case body 130. This example describes a case where the case body 130 is a desk, which is used in an office and the retracting unit 110 is a server for a personal computer, which is accommodated under the desk and can be retracted or extended, as needed. A concrete example of the case body 130 and the retracting unit 110 is not limited to the above-mentioned example. Then, any structure may be used if the structure includes a case body and a retracting unit retractably accommodated in the case body, such as a refrigerator body and a storage tray or the like retractably mounted on the refrigerator body, and a cable or the like such as a power supply line, an input/output cable for a signal and a signal line for a sensor or the like must be trained between the case body and the retracting unit.

As shown in FIG. 1, a cable or the like such as a power supply line, a signal cable or the like is protected by a protective guide for a cable or the like such that it is trained between the back inside of the case body 130 and the back outside of the retracting unit 110.

This protective guide for the cable or the like includes two linear tubular support members 140, which support the cable or the like in a linear manner, and a tubular bending member 120, which connects the two linear support member in a required curvature without a sharp bend. The ends of the two linear support members 140 are pivoted on the case body 130 and the retracting unit 110 by fittings 150, respectively. Further, as shown in FIG. 1, even if the retracting unit 110 is fully retracted, the impartment of excessive bending stress to the cable or the line is avoided by interposing a link member between the linear support member 140 and the fitting 150.

Figure 2:
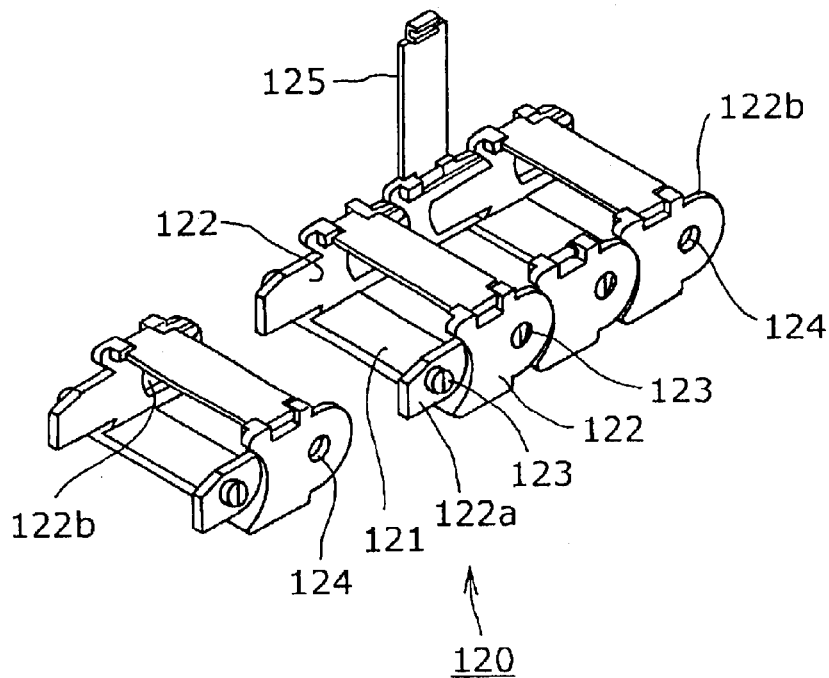
FIG. 2 is a perspective view of a bending member used in the protective guide for the retracting cable or the like shown in FIG. 1

Concrete structures of the tubular bending member 120 and the linear support member 140 will be described in detail with reference to FIGS. 2 and 3. FIG. 2 shows one example of a bending member 120 used in the present invention. This bending member 120 is formed by connected plural pairs of link plates 122, 122. The pair of link plates 122, 122 are connected to a support frame 121 in an opposed manner. Further, an arm or cover plate 125, whose one end was rotatably pivoted on the link plate 122, is mounted on the pair of link plates 122 in an openable manner.

Further, a plurality of link plates are articulately connected to each other by fitting a connecting projection or stud 123 integrally molded on the link plate into a connecting hole 24 engraved or otherwise formed in the link plate. And in the link plate to be connected, the outside 122a and the inside 122b, which are overlapped, are shaped to engage each other, so that the rotation of the connected link plates is limited to a desired range. In the example of the protective guide 100 for the retracting cable or the like shown in FIG. 1, the bending member 120 is formed by six connected link plates, and bending at an angle sharper than the desired curvature is avoided.

Figure 3:
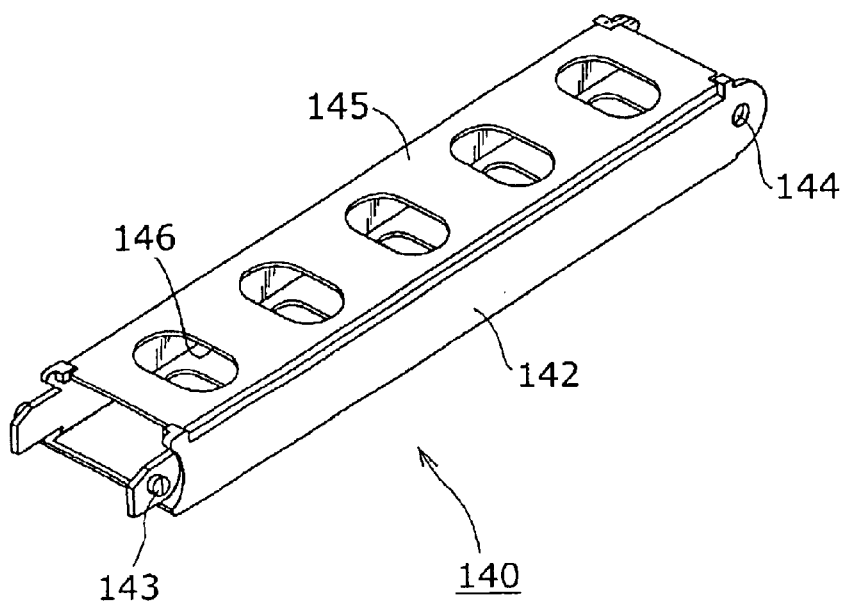
FIG. 3 is a perspective view of a linear support member used in the protective guide for the retracting cable or the like shown in FIG. 1.

FIG. 3 shows one example of a linear tubular support member 140 used in the present invention. This linear support member 140 has a shape in which one link plate 142 forming the above-mentioned bending member is elongated in the axial direction. Further, a connecting projection or stud 143 provided on one end of the link plate 142 is rotatably connected to a fitting 150 (FIG. 1) disposed on the case body and the retracting unit. Further, a connecting hole 144 engraved or otherwise formed in the other end of the link plate 142 is fitted to a connecting projection or stud in end link plate of the bending member 120. One side of an arm 145 forming one side of the linear tubular support member 140 is rotatably pivoted on the link plate 142 so that the arm 145 is mounted on the link plate in an openable manner.

It is noted that the arm 145 may be formed as a cover plate having substantially the same length as the link plate 142, but as shown in FIG. 3, the arm or plate 145 may have a plurality of openings. Although not shown, it may alternatively comprise a plurality of short arms or plates with spaces therebetween. Not only such a structure does not store heat in the protective guide even though the cable is heated, but also an reduction in material costs and weight reduction of the guide may be exerted. Further, when the present device is used in the connection between the desk in the office and the server for a personal computer accommodated under the desk as in the example, a flow of cooling wind W from a cooling fan 115 mounted on the back of the server to a cooling hole 135 is not prevented by forming a plurality of openings 146 in the plate 145 as described above. Further, a cable or the like in the protective guide for a cable or the like is preferably cooled by the cooling wind W flowing in the protective guide for the cable or the like through the openings 146, or in the spaces between the short arms. It is noted that the openings 146 in the top plate 145 register with corresponding openings in the bottom plate, as shown in FIG. 3.

In the example, the arm or plate 125 provided in the tubular bending member 120 and the plates 145 provided in the linear tubular support member 140 are mounted in an openable manner with respective to the link plates 122 and 142, respectively as described above. Therefore, after the protective guide for the cable or the like was secured to the cable body and the retracting unit, the plate 125 and the plate 145 are opened and the cable or the like can be accommodated therein. Further, after closing the cover plates 125 and 145 to install a cable in the protective enclosure formed under the cover plates, a change of the cable or the like and an addition thereto can be easily performed, by opening the plates 125 and 145.

It is noted that although, in the above-mentioned example, a chain-like bending member was used in which a plurality of link plates were articulately connected to each other by fitting connecting projections or studs integrally formed in the link plates to the connecting holes engraved or otherwise formed in the link plates, the bending member is not limited to the example if the bending member has a structure in which a curvature in its bending can be reliably limited to the desired curvature without a sharp bend. For example, a synthetic resin flexible pipe or the like whose outer peripheral surface is formed in a bellows shape can be used.

Further, if the linear support member can reliably support a cable or the like in a linear manner, any structure of the linear support member may be used. For example, the entire protective guide for a cable or the like may comprise the above-mentioned chain type bending member in which a plurality of link plates were articulately connected to each other and a linear support member formed by covering the cable or the like with two pipes each having a required length and a rectangular section.

Since the protective guide for a retracting cable or the like according to the present invention includes two linear tubular support members, which enclose said cable or the like to support it in a linear manner and a tubular bending member, which articulately connect said two linear support members in a desired curvature without a sharp bend. Accordingly, a retracting unit can be moved in or out without imparting excessive tension or stress to the cable or the like. Further, the cable or the like is only accommodated in a protective guide for a cable or the like and it is not necessary to secure it whereby installation of the cable or the like extremely becomes simple. Additionally, since the cable or the like is enclosed within the protective guide for the cable or the like, the protective guide is excellent even in point of aesthetics.

What is claimed is:

1. For a retracting cable, a protective guide which protects and guides a retracting cable trained between a case body and a retracting unit retractably accommodated in the case body, characterized in that said protective guide includes two linear support members, which enclose said cable to support it in a linear manner, said two linear support members comprising cover plates mounted in an openable manner affording installation or the retracting cable under said cover plates, and a bending member, which articulately connects said two linear support members for relative angular movement with a desired curvature without a sharp bend.

2. A guide according to claim 1 wherein said bending member comprises a plurality of links articulately connected to each other, said plurality of links comprising cover plates mounted in an openable manner affording installation of the retracting cable under said cover plates.

3. A guide according to claim 1 wherein said linear support members and said bending member comprise tubular enclosures for the retracting cable or the like.

* * * * *